UNITED STATES PATENT OFFICE.

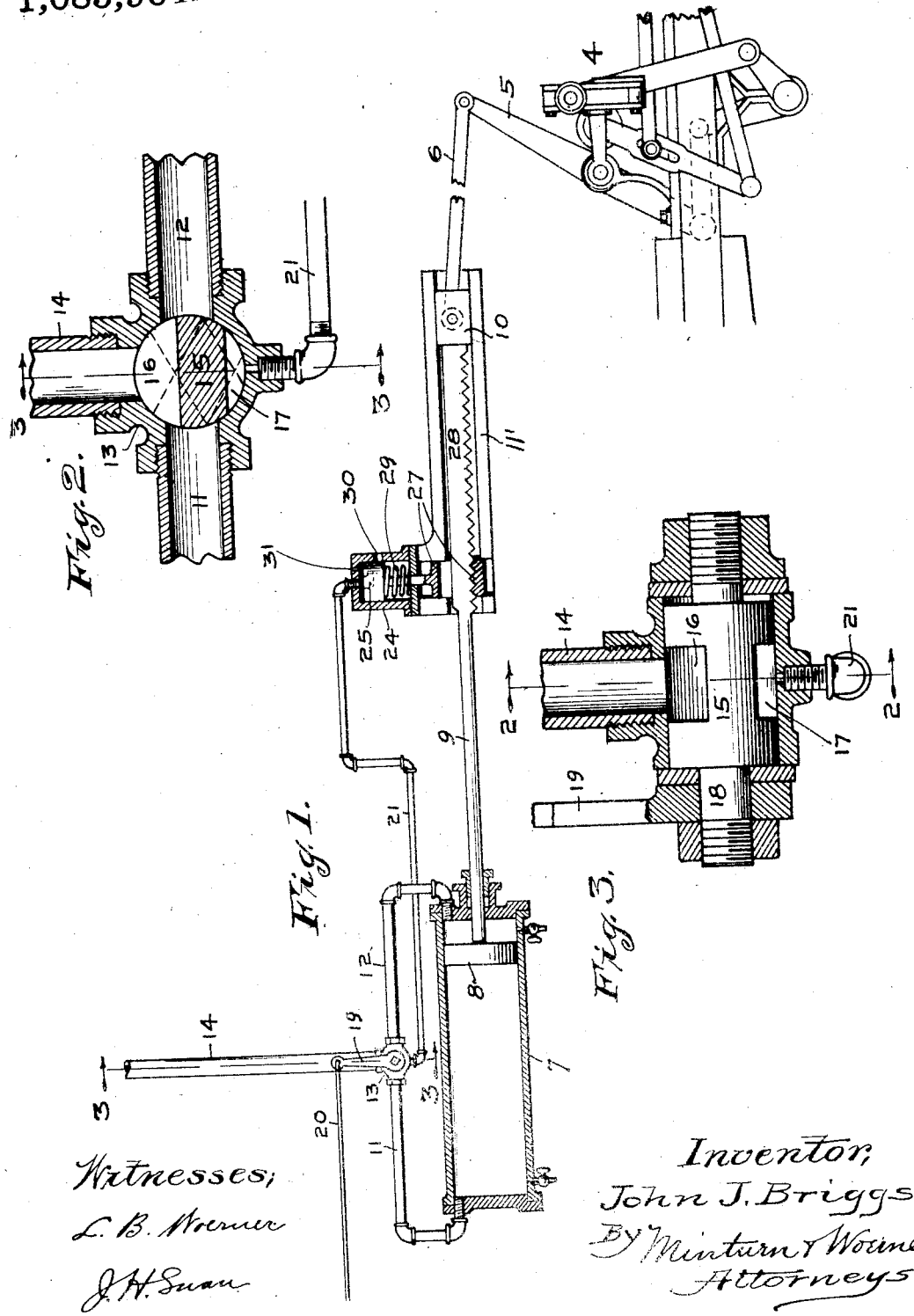

JOHN J. BRIGGS, OF INDIANAPOLIS, INDIANA.

DEVICE FOR SETTING AND LOCKING THE REVERSE MECHANISM OF LOCOMOTIVES.

1,085,964.  Specification of Letters Patent.  Patented Feb. 3, 1914.

Application filed November 15, 1912. Serial No. 731,301.

*To all whom it may concern:*

Be it known that I, JOHN J. BRIGGS, a citizen of the United States, residing at Indianapolis, in the county of Marion and State of Indiana, have invented certain new and useful Improvements in Devices for Setting and Locking the Reverse Mechanism of Locomotives, of which the following is a specification.

This invention relates to power actuating means for operating the reverse levers of locomotives, and the object of the invention is to provide a simple, quick acting, positive device, operated by steam or compressed air, which will automatically unlock the reverse levers and move them to the desired new position and again lock them.

I accomplish the objects of the invention by the mechanism illustrated in the accompanying drawing, in which—

Figure 1 is a view in side elevation of a portion of the valve reversing mechanism, with my invention applied thereto and illustrated in partial vertical section. Fig. 2 is a detail in section on the line 2—2 of Fig. 3 showing the valve for controlling the supply of steam or air to the cylinder which operates the reverse levers, the view being on a larger scale than that of Fig. 1, and Fig. 3 is a section of the valve on the lines 3—3 of Figs. 1 and 2.

Like characters of reference indicate like parts throughout the several views of the drawing.

A part of the valve reversing mechanism of a locomotive engine is shown at 4 and includes a lever 5 which is ordinarily connected with a hand lever in the engineer's cab by means of a connecting rod 6, but my invention relates to means for operating the connecting rod and locking it in any given position, by the aid of steam or compressed air as compelling agents.

My device comprises a cylinder 7, within which is a reciprocating piston 8, mounted on a piston rod 9, terminating with a cross head 10 operating between guides 11'. The cross head 10 is pivotally connected to the rod 6, and through the latter with the reversing mechanism above described. Steam, from the boiler, or compressed air from the supply used in the air brake system, is introduced at one end of the cylinder through the pipe 11, and at the other end of the cylinder through the pipe 12, and the pipes 11 and 12 are connected with the same valve housing 13, to which the steam or compressed air, as the case may be is supplied through the pipe 14. The valve housing 13 has a cylindrical valve seat which receives a correspondingly shaped valve 15, which valve has a recess 16 on one side and a shallower recess 17 on its diametrically opposite side. The valve 15 has an extension 18 (see Fig. 3) which projects outside of the casing, and to which a lever 19 is secured, and if need be, a rod 20, attached to the lever 19, extends within easy reach of the engineer. The valve 15 will be rocked to change the communications through pipes 11 and 12 to the cylinder in order thereby to change the position of the piston 8 in said cylinder.

The lower part of the housing 13 is provided with an opening which discharges into a pipe 21, through which, when the steam supply to either of the pipes 11 or 12 is shut off by valve 15, the steam in that pipe and in the cylinder end with which it communicates will exhaust, and remove any resistance to the travel of the piston in that direction, and the steam or compressed air, as the case may be, thus admitted to the pipe 21 will be utilized to operate a mechanism for locking and unlocking the reverse mechanism, as will be hereinafter fully described.

When the valve 15 is in the position shown by the full lines in Fig. 2 the discharge to the pipe 21 is closed and equal amounts of steam (or compressed air) are admitted to the cylinder 7 on both sides of the piston. When the valve 15 is turned to the right, as shown by dotted lines in Fig. 2, discharge to the pipe 11 will be closed from pipe 14 but the communication to the pipe 12 will be opened larger, and the discharge from pipe 11 through the pipe 21 will be opened. When the valve 15 is turned to the left to the position shown in dotted lines in Fig. 2 the supply from the pipe 14 to the pipe 12 is cut off, and it is increased from the pipe 14 to the pipe 11, and the exhaust is opened from the pipe 12 through the pipe 21.

The pull of the locomotive engines on the reverse mechanism has such a tendency to change any position given it that it is necessary to provide a positive locking means to hold the different adjustments, and this must be automatically controlled so as to operate in time with the reverse mechanism. For this purpose I utilize the exhaust from the valve 13 which is received into the pipe 21 and is discharged into a cylinder 24. Operating in the cylinder 24 is a piston 25 which is forced down by the steam (or air) supplied through pipe 21 to the upper end of the cylinder as shown in Fig. 1. A rod 26 from piston 25 terminates outside of the cylinder in a head 27, operating in suitable guides, and slotted. Through the slot in the head 27 a flattened portion 28 of the piston 9 is passed. The bottom of the slot in the head 27 is provided with a series of teeth which are adapted to engage with corresponding teeth in the lower or adjacent edge of the flattened portion 28 of the piston rod 9. A spring 29 in the cylinder 24 normally raises the piston 25 and through it the piston rod 26 and the head 27 bringing the teeth in the head 27 into locking engagement with the teeth on the part 28 on the piston rod 9.

When steam (or compressed air) is admitted under pressure through pipe 21 the piston 25 is lowered, compressing spring 29 and lowering head 27 and releasing the piston rod 9. The piston 25 moves down until a port 30 in the side of the cylinder 24, normally closed by the piston 25, is opened by the lowering of the piston 25, and thereupon the steam (or air) is allowed to escape to atmosphere and the pressure on the piston removed. The spring 29 then acts to raise the piston 25, and any remaining steam (or air) in the piston 24 is permitted to escape through a very much smaller port opening 31 in the end of the cylinder.

By the above described mechanism steam (or air) may be admitted to the cylinder 7 at will to move the piston 8. This is accomplished by moving the valve 15, which at once admits steam to the pipe 21 and thence to cylinder 24, unlocking the piston rod 9 and then the pressure in the cylinder 7 moving the piston 8 will operate the connecting rod 6 to actuate the valve reversing mechanism of the engine and the valve 15 being returned to the position shown in Fig. 2 cutting off the steam supply to cylinder 24, releases piston 25 and the latter is raised by spring 29 causing the toothed head 27 to engage the toothed member 28, thereby again locking the reversing mechanism.

While I have described my invention with more or less minuteness as regards details of construction and arrangement and as being embodied in certain precise forms, I do not desire to be limited thereto unduly or any more than is pointed out in the claims. On the contrary, I contemplate all proper changes in form, construction, and arrangement, the omission of immaterial elements and the substitution of equivalents, as circumstances may suggest or necessity render expedient.

I claim—

1. In a device for moving and holding the reverse mechanism of a locomotive, a cylinder, a piston therein, a piston-rod, means connecting the piston-rod and reverse mechanism, means for automatically locking the reverse mechanism, means actuated by an expansive fluid for unlocking it, a valve, means for supplying an expansive fluid to the valve, conduits discharging from the valve into opposite ends of the cylinder at certain positions of the valve, and a conduit discharging from said valve to said unlocking means at certain other positions of the valve.

2. In a device for setting and locking the reverse mechanism of a locomotive, a cylinder, a piston, a piston-rod, means connecting the piston-rod and reverse mechanism, means for locking the reverse mechanism, means actuated by an expansive fluid for unlocking it, a four-way valve, means for supplying an expansive fluid to the valve, conduits discharging from the valve into opposite ends of the cylinder at certain positions of the valve, and a conduit discharging from said valve to said unlocking means at certain other positions of the valve.

3. In a device for setting and locking the reverse mechanism of a locomotive, a cylinder, a piston, means connecting the piston and the reverse mechanism, said means having indentations, a second cylinder, a piston therein, means carried by the last piston having means to engage said indentations of said connecting means, automatic means to effect said engagement, a valve, means for supplying an expansive fluid to the valve, conduits discharging from the valve into opposite ends of said first cylinder at certain positions of the valve, and a conduit discharging from said valve to the second cylinder at other positions of the valve.

4. In a device for setting and locking the reverse mechanism of a locomotive, a cylinder, a piston, means connecting the piston and the reverse mechanism, said means having indentations, a second cylinder having an exhaust port in its side and a smaller exhaust in its end, a piston in the second cylinder closing and opening the exhaust port by the travel of said piston, a spring to press the piston outwardly, a piston rod, means on said rod to engage the indentations of said connection between the first piston and reverse mechanism when the piston in the second cylinder is pressed outwardly by said spring, a valve, means for supplying expansive fluid to the valve, conduits discharging from the valve to the opposite ends of said first cylinder at certain positions of the valve and the conduit discharging from said valve to the second cylinder at other positions of the valve.

In witness whereof, I have hereunto set my hand and seal at Indianapolis, Indiana, this 11th day of November, A. D. one thousand nine hundred and twelve.

JOHN J. BRIGGS. [L. S.]

Witnesses:
F. W. WOERNER,
IDA L. LARSON.